United States Patent
Gehrmann

(10) Patent No.: US 10,951,413 B2
(45) Date of Patent: Mar. 16, 2021

(54) TRUSTED KEY SERVER

(71) Applicant: Fingerprint Cards AB, Gothenburg (SE)

(72) Inventor: Christian Gehrmann, Lund (SE)

(73) Assignee: Fingerprint Cards AB, Gothenburg (SE)

( * ) Notice: Subject to any disclaimer, the term of this patent is extended or adjusted under 35 U.S.C. 154(b) by 0 days.

(21) Appl. No.: 16/485,985

(22) PCT Filed: Feb. 12, 2018

(86) PCT No.: PCT/SE2018/050128
§ 371 (c)(1),
(2) Date: Aug. 14, 2019

(87) PCT Pub. No.: WO2018/156067
PCT Pub. Date: Aug. 30, 2018

(65) Prior Publication Data
US 2020/0235932 A1 Jul. 23, 2020

(30) Foreign Application Priority Data
Feb. 21, 2017 (SE) .................... 1750177-6

(51) Int. Cl.
*H04L 29/06* (2006.01)
*H04L 9/32* (2006.01)
(Continued)

(52) U.S. Cl.
CPC .......... *H04L 9/3231* (2013.01); *H04L 9/0866* (2013.01); *H04L 9/0869* (2013.01);
(Continued)

(58) Field of Classification Search
CPC .... H04L 9/3231; H04L 9/0866; H04L 9/3247
See application file for complete search history.

(56) References Cited

U.S. PATENT DOCUMENTS

| 7,181,017 B1 | 2/2007 | Nagel et al. |
| 8,001,055 B2 * | 8/2011 | Weiss .............. G06Q 20/40145 705/76 |

(Continued)

FOREIGN PATENT DOCUMENTS

| AU | 2013219149 A1 | 9/2013 |
| WO | 2009009788 A1 | 1/2009 |

(Continued)

OTHER PUBLICATIONS

Niranjani, D. et al., "Distributed Security Architecture for Authentication in 4G Networks," 2016 IEEE International Conference on Advances in Computer Applications (ICACA), 2016, pp. 286-291.
(Continued)

*Primary Examiner* — Sher A Khan
(74) *Attorney, Agent, or Firm* — RMCK Law Group, PLC

(57) ABSTRACT

The invention relates to methods and devices for enabling authentication of a user based on biometric data. In an aspect of the invention a method performed by a trusted network node is provided for enabling authentication of a user of a second client device based on biometric data captured by a first client device.

20 Claims, 7 Drawing Sheets

(51) Int. Cl.
  *H04L 9/08* (2006.01)
  *H04L 9/14* (2006.01)
  *H04L 9/30* (2006.01)

(52) U.S. Cl.
  CPC ............... *H04L 9/14* (2013.01); *H04L 9/30* (2013.01); *H04L 9/3213* (2013.01); *H04L 9/3247* (2013.01)

(56) References Cited

U.S. PATENT DOCUMENTS

| | | | |
|---|---|---|---|
| 9,619,804 B1* | 4/2017 | Thatte | G06Q 20/40145 |
| 2006/0117181 A1* | 6/2006 | Brickell | H04L 9/3271 |
| | | | 713/176 |
| 2007/0106895 A1* | 5/2007 | Huang | H04L 9/3247 |
| | | | 713/170 |
| 2009/0019285 A1* | 1/2009 | Chen | G06F 21/575 |
| | | | 713/175 |
| 2010/0250957 A1 | 9/2010 | Cuppett | |
| 2012/0144198 A1* | 6/2012 | Har | H04L 63/0884 |
| | | | 713/170 |
| 2014/0289833 A1 | 9/2014 | Briceno et al. | |
| 2014/0337634 A1* | 11/2014 | Starner | G06F 3/013 |
| | | | 713/186 |
| 2015/0178548 A1* | 6/2015 | Abdallah | H04L 63/06 |
| | | | 382/124 |
| 2015/0269389 A1* | 9/2015 | Lee | G06F 21/6209 |
| | | | 713/164 |
| 2015/0281225 A1 | 10/2015 | Schoen et al. | |
| 2015/0363398 A1* | 12/2015 | Kerr | G06F 16/51 |
| | | | 348/77 |
| 2016/0065374 A1* | 3/2016 | Sauerwald | H04L 9/3234 |
| | | | 726/19 |
| 2016/0373440 A1 | 12/2016 | Mather et al. | |
| 2017/0055146 A1 | 2/2017 | Ko | |
| 2017/0118196 A1* | 4/2017 | Ponsini | H04L 9/3265 |
| 2017/0264599 A1* | 9/2017 | O'Regan | G06F 21/32 |
| 2018/0212960 A1* | 7/2018 | Sandeep | G06F 21/32 |

FOREIGN PATENT DOCUMENTS

| | | |
|---|---|---|
| WO | 2009031110 A2 | 3/2009 |
| WO | 2012168838 A1 | 12/2012 |

OTHER PUBLICATIONS

PCT International Search Report and Written Opinion dated Apr. 27, 2018 for International Application No. PCT/SE2018/050128, 12 pages.

\* cited by examiner

| 100 | client device |
| 102 | fingerprint sensor |
| 104 | display unit |
| 106 | touch screen interface |

| 102 | fingerprint sensor |
| 201 | finger |
| 202 | sensing element |

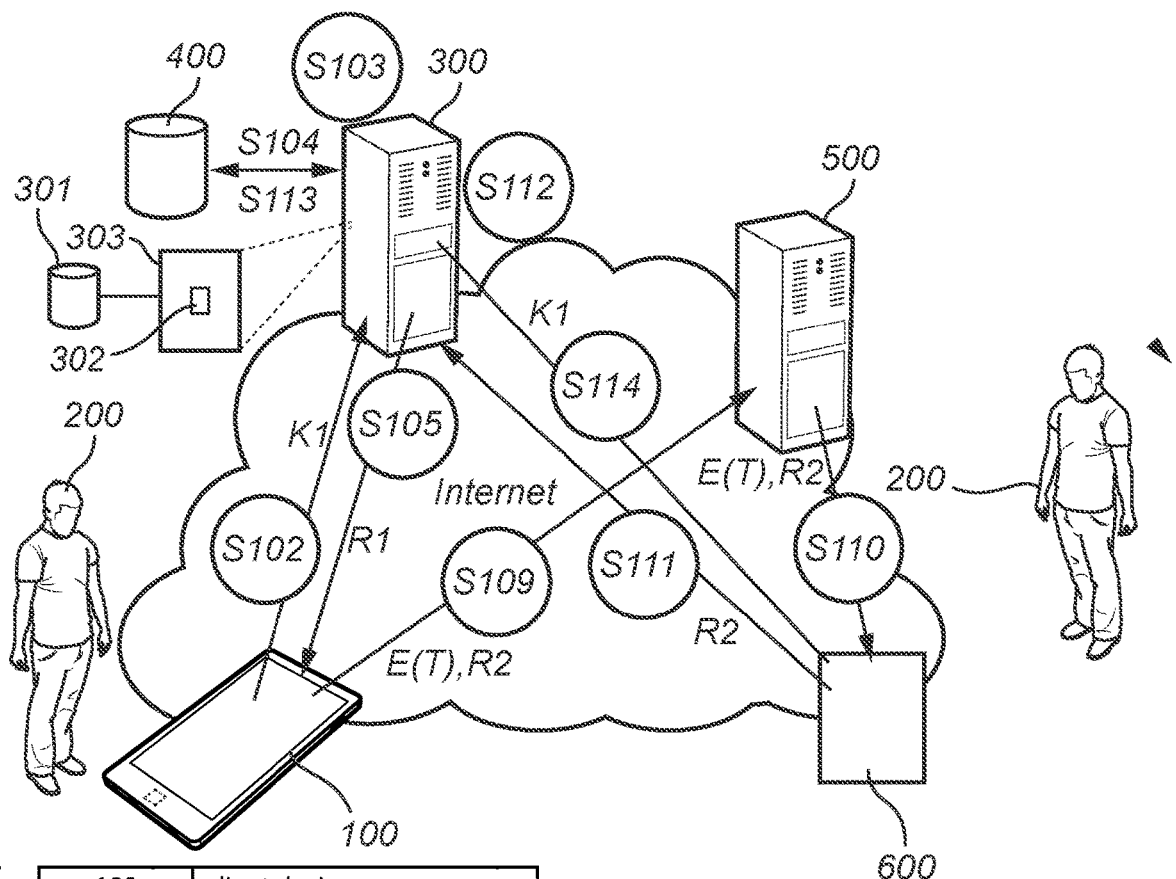

| 100 | client device |
|---|---|
| 200 | user |
| 300 | trusted server |
| 301 | processing unit |
| 302 | computer program |
| 303 | storage medium |
| 400 | secure key repository |
| 500 | 3rd party server |
| 600 | second client device |
| K1 | key |
| R1 | reference info |
| S101 | generate key (K1) |
| S102 | client device submits key to trusted server |
| S103 | associate key with reference info |
| S104 | store key and reference info |
| S105 | trusted server submits reference info to client device |
| T | biometric data |
| S106 | capture biometric data T |

| S107 | encrypt biometric data using K1 |
|---|---|
| E(T) | encrypted biometric data |
| R2 | authentication token |
| S108 | create authentication token |
| S109 | submit E(T) and R2 to 3rd party server 500 |
| S110 | submit E(T) and R2 to second client device 600 |
| S111 | submit R2 to trusted server 300 |
| S112 | authenticate R2 |
| S113 | acquire K1 from key repository |
| S114 | submit K1 to second client device 600 |
| S115 | decrypt E(T) using K1 |
| T' | biometric data |
| S116 | capture biometric data T' |
| S117 | Compare T' to T |

Fig. 4A

TRUSTED KEY SERVER

CROSS-REFERENCE TO RELATED APPLICATIONS

This application is a 371 U.S. National Stage of International Application No. PCT/SE2018/050128, filed Feb. 12, 2018, which claims priority to Swedish Patent Application No. 1750177-6, filed Feb. 21, 2017. The disclosures of each of the above applications are incorporated herein by reference in their entirety.

TECHNICAL FIELD

The invention relates to methods and devices for enabling authentication of a user based on biometric data.

BACKGROUND

In prior art multi-user biometric authentication systems, there is a need to capture biometric data at one client device implementing recognition of a user based on the biometric data, such as fingerprint recognition, while making the biometric data available for authentication at another biometric authentication device.

However, as original biometric data templates are very sensitive from a security point of view, it is of utmost important to ensure that original biometric data only is available on trusted biometrics-reading devices and that the biometric data never leaves a secure computing environment on such devices.

Biometrics allow efficient end-user identification without the need for the end-user to remember a username or password or carrying a special purpose hardware token. However, while privacy implications can be mitigated when authentication based on biometric data is performed on a single device, it is very important to protect the original biometric data when transferring the biometric data between devices.

Biometric data must by definition be available at a biometric sensor. It is not controversial to store a limited amount of biometric data at a specific biometric sensor. Hence, as long as security can be guaranteed upon transferring biometric data from one device to another, it is acceptable to transfer a limited number of biometric data templates. However, there must be a mechanism in place that can ensure that the clear-text biometric data only is available in trusted biometric sensor devices and at no other locations during transfer, which is practically difficult to achieve.

SUMMARY

An object of the present invention is to solve, or at least mitigate, this problem in the art and thus to provide a method of enabling authentication of a user at a second client device based on biometric data of the user initially captured at a first client device.

This object is attained in a first aspect of the invention by a method performed by a first client device of enabling authentication of a user of the first client device at a second client device based on biometric data captured by the first client device. The method comprises generating at least one secret key subsequently used for encrypting biometric data of the user captured by the first client device, submitting the generated at least one secret key to a trusted network node over a secure communication channel for registering the at least one secret key with the trusted network node, and receiving reference information associated with the at least one secret key from the trusted network node. The method further comprises capturing biometric data of the user, encrypting the captured biometric data using the generated at least one secret key, creating an authentication token based on the received reference information, which token is configured to be authenticated by the trusted network node, and submitting the encrypted biometric data and the authentication token to a $3^{rd}$ party network node for enabling authentication of the user via the second client device.

This object is attained in a second aspect of the invention by a method performed by a second client device of enabling authentication of a user of a first client device at the second client device based on biometric data captured by the first client device. The method comprises receiving, from a $3^{rd}$ party network node for authentication of the user of the second client device, encrypted biometric data of the user and an authentication token, submitting the authentication token to a trusted network node over a secure communication channel, the authentication token indicating a secret key previously registered with the trusted network node by the first client device, with which secret key the biometric data is encrypted by the first client device, and receiving the secret key from the trusted network node, if the trusted network node is capable of authenticating the authentication token, wherein the encrypted biometric data can be decrypted using the received secret key.

This object is attained in a third aspect of the invention by a method performed by a trusted network node of enabling authentication of a user of a second client device based on biometric data captured by a first client device. The method comprises receiving at least one secret key from the first client device over a secure channel, which key subsequently is used by the first client device for encrypting biometric data of the user captured by the first client device, associating the received at least one secret key with reference information, storing the reference information and the at least one secret key in a key repository, and submitting the reference information to the first client device. The method further comprises receiving, from the second client device, an authentication token created by the first client device based on the received reference information, the authentication token indicating the at least one secret key previously registered with the trusted network node, authenticating the received authentication token, acquiring the at least one secret key indicated by the authentication token from the key repository, and submitting the acquired at least one secret key to the second client device, wherein the second client device subsequently is capable of decrypting encrypted biometric data of the user for enabling authentication of the user.

This object is attained in a fourth aspect of the invention by a first client device configured to enable authentication of a user of the first client device at a second client device based on biometric data captured by the first client device. The first client device comprises a biometric data sensing system comprising a biometric data sensor and a processing unit. The processing unit is configured to generate at least one secret key subsequently used for encrypting biometric data of the user captured by the first client device, submit the generated at least one secret key to a trusted network node over a secure communication channel for registering the at least one secret key with the trusted network node, receive reference information associated with the at least one secret key from the trusted network node. The biometric data sensor is configured to capture biometric data of the user. Further, the processing unit is configured to encrypt the captured biometric data using the generated at least one secret key, create an authentication token based on the received reference information, which token is configured to be authenticated by the trusted network node, and submit the encrypted biometric data and the authentication token to a $3^{rd}$ party network node for enabling authentication of the user via the second client device.

This object is attained in a fifth aspect of the invention by a second client device configured to enable authentication of a user of a first client device at the second client device based on biometric data captured by the first client device. The second client device comprises a biometric data sensing system comprising a biometric data sensor and a processing unit. The processing unit is configured to receive, from a $3^{rd}$ party network node for authentication of the user of the second client device, encrypted biometric data of the user and an authentication token, submit the authentication token to a trusted network node over a secure communication channel, the authentication token indicating a secret key previously registered with the trusted network node by the first client device, with which secret key the biometric data is encrypted by the first client device, and receive the secret key from the trusted network node, if the trusted network node is capable of authenticating the authentication token, wherein the encrypted biometric data can be decrypted using the received secret key.

This object is attained in a sixth aspect of the invention by a trusted network node configured to enable authentication of a user of a second client device based on biometric data captured by a first client device. The trusted network node comprises a processing unit being configured to receive at least one secret key from the first client device over a secure channel, which key subsequently is used by the first client device for encrypting biometric data of the user captured by the first client device, associate the received at least one secret key with reference information, store the reference information and the at least one secret key in a key repository, submit the reference information to the first client device, and receive, from the second client device, an authentication token created by the first client device based on the received reference information, the authentication token indicating the at least one secret key previously registered with the trusted network node. The processing unit is further configured to authenticate the received authentication token, acquire the at least one secret key indicated by the authentication token from the key repository, and submit the acquired at least one secret key to the second client device, wherein the second client device subsequently is capable of decrypting encrypted biometric data of the user for enabling authentication of the user.

Hence, a first client device generates one or more secret biometric data protection keys subsequently used for encrypting biometric data of a user which is captured by the first client device. The secret key is subsequently acquired by a second client device for decrypting encrypted biometric data of the user.

The first client device submits the generated secret biometric data protection key to a trusted network node, in the following referred to as a trusted server, over a secure communication channel, for registering the secret key with the trusted server.

Upon receiving the secret key, the trusted server associates the received secret key with reference information for subsequently identifying the key, stores the key and the associated reference information in a secure key repository located at, or remote from, the trusted server, and submits the reference information to the first client device.

The first client device captures biometric data of the user, for instance by utilizing a fingerprint sensing system, and encrypts the captured biometric data using the generated secret key, resulting in an encrypted biometric data set.

Further, the first client device creates an authentication token based on the received reference information, which token is configured to subsequently be authenticated by the trusted network node, and submits the encrypted biometric data and the authentication token over a secure communication channel to a $3^{rd}$ party server for further distribution to the second client device.

Assuming for instance that the user subscribes to a service provided by the $3^{rd}$ party server, such as an e-commerce service with which the user authenticates herself using fingerprint data instead of a Personal Identification Number (PIN) to effect a payment of goods bought via the e-commerce service. The described embodiment advantageously enables authentication of the user at the second client device for accessing the e-commerce service provided by the $3^{rd}$ party server.

Hence, by submitting the encrypted biometric data and the authentication token over a secure communication channel to the $3^{rd}$ party server for further distribution to the second client device, the first client device effectively delegates its protected biometric data information to the $3^{rd}$ party server that uses biometric identification to grant access to users subscribing to its offered services.

The trusted $3^{rd}$ party server then submits the encrypted biometric data and the authentication token to the second client device, which in its turn submits the authentication token to the trusted server over a secure communication channel.

The authentication token indicates—by comprising the reference information—the secret key previously registered by the first client device with the trusted server, with which key the biometric data of the user is encrypted.

The trusted server authenticates the received authentication token, and in case the token is successfully authenticated, the trusted server decrypts the authentication token and is thus given access to the reference information, which the trusted server uses to acquire the secret key from the key repository. It is noted that the key repository may comprises a large number of keys which needs to be identified with a corresponding set of reference information.

Thereafter, the trusted server submits the acquired secret key to the second client device, wherein the second client device is capable of decrypting the encrypted biometric data of the user, as received from the $3^{rd}$ party server, for enabling authentication of the user.

Subsequently, upon performing authentication of the user with the $3^{rd}$ party server via the second client device, the encrypted biometric data is decrypted with the secret key received from the trusted server, resulting in clear-text biometric data.

These operations are performed in a secure execution environment of the second client device in order to minimize the risk of any security breaches occurring.

Now, when the user wishes to authenticate herself at the second client device, she presents her biometric data in the form of e.g. a fingerprint to the second client device which captures the biometric data of the user, and compares the captured biometric data with the decrypted biometric data.

If there is a match, the user is authenticated and can thus access the service provided by the trusted $3^{rd}$ party server.

Advantageously secure transfer of biometric template data from one biometric-reader device to another is facilitated without exposing the biometric data in clear text outside secure execution environment of the biometric-reader device. A trusted server is used for managing biometric data protection keys on behalf of end-users and ensures that the keys only are distributed to biometric-reader devices that are explicitly verified by the trusted server to be trustworthy.

Various embodiments of the invention will be described in the detailed description.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIGS. 4A and 4B illustrate an embodiment of the invention of enabling authentication of a user of a first client device at a second client device based on biometric data of the user initially captured at the first client device;

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
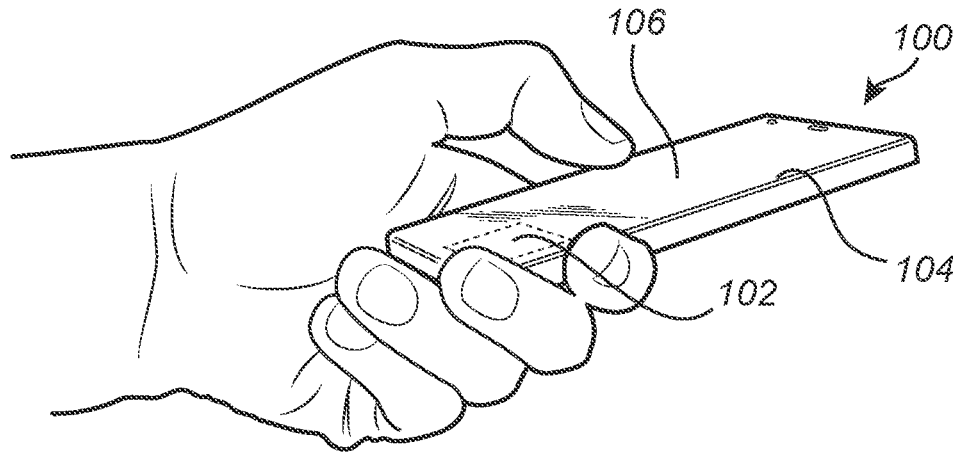
FIG. 1 shows a client device in the form of a smart phone in which the present invention may be implemented.

FIG. 1 shows a client device 100 in the form of a smart phone in which the present invention may be implemented. The smart phone 100 is equipped with a fingerprint sensor 102 and a display unit 104 with a touch screen interface 106. The fingerprint sensor 102 may, for example, be used for unlocking the mobile phone 100 and/or for authorizing transactions carried out using the mobile phone 100, etc. The fingerprint sensor 102 may alternatively be placed on the backside of the mobile phone 100. It is noted that the fingerprint sensor 102 could be integrated in the display unit/touch screen or form part of a smart phone home button.

It is understood that the fingerprint sensor 102 according to embodiments of the invention may be implemented in other types of electronic devices, such as laptops, remote controls, tablets, smart cards, etc., or any other type of present or future similarly configured device utilizing fingerprint sensing.

Figure 2:
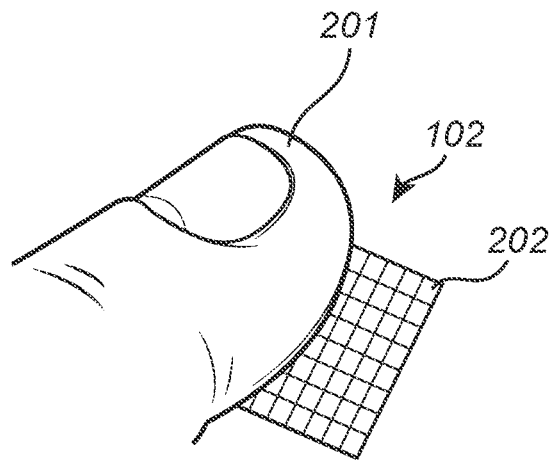
FIG. 2 shows a view of a fingerprint sensor onto which a user places her finger.

FIG. 2 illustrates a somewhat enlarged view of the fingerprint sensor 102 onto which a user places her finger 201. In the case of employing a capacitive sensing technology, the fingerprint sensor 102 is configured to comprise a plurality of sensing elements. A single sensing element (also denoted as a pixel) is in FIG. 2 indicated by reference numeral 202.

Figure 3:
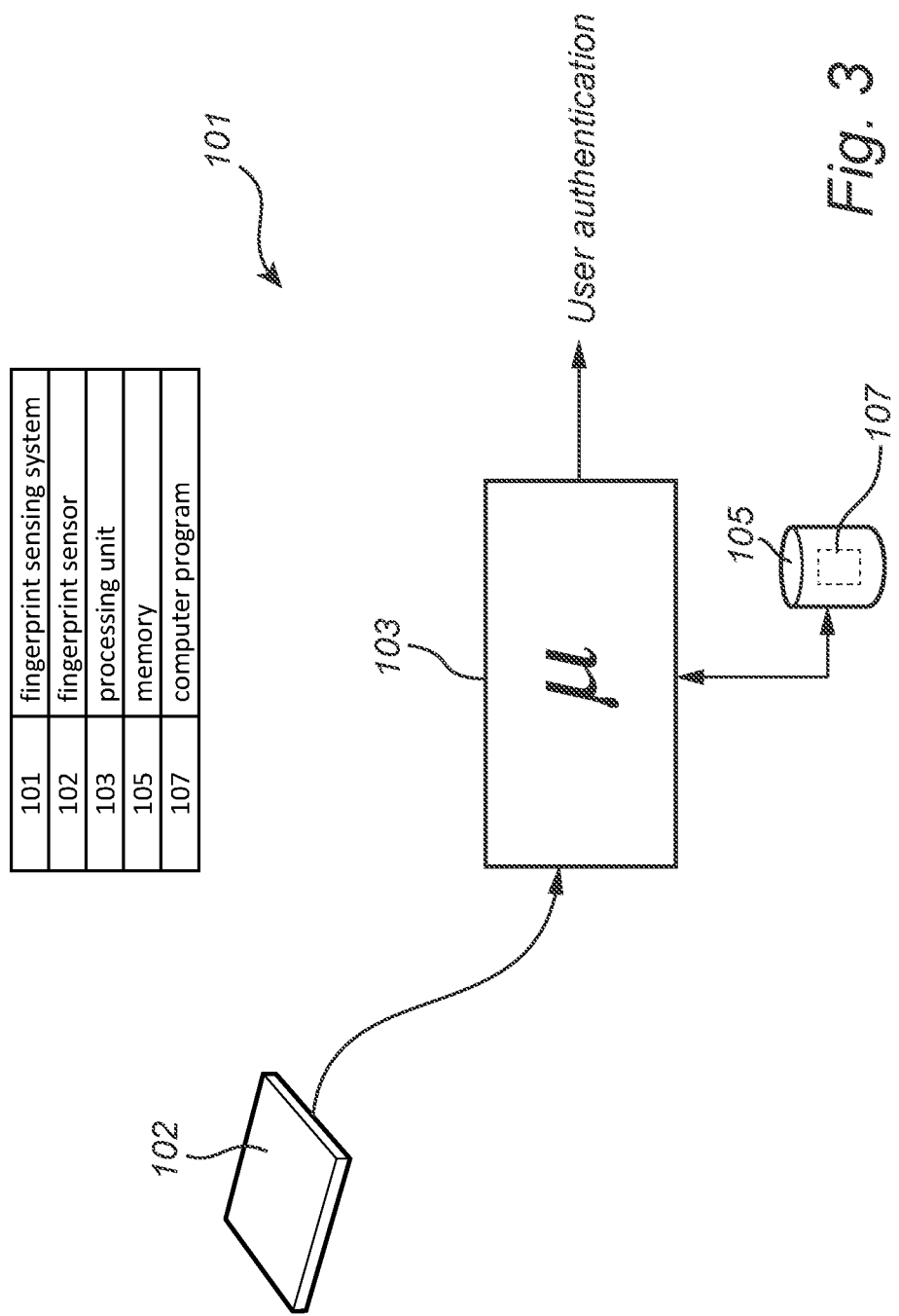
FIG. 3 shows a fingerprint sensor being part of a fingerprint sensing system according to an embodiment.

FIG. 3 shows the fingerprint sensor 102 being part of a fingerprint sensing system 101. The fingerprint sensing system 101 comprises the fingerprint sensor 102 and a processing unit 103, such as a microprocessor, for controlling the fingerprint sensor 102 and for analysing captured fingerprints. The fingerprint sensing system 101 further comprises a memory 105. The fingerprint sensing system 101 in turn, typically, forms part of the electronic device 100 as exemplified in FIG. 1.

Now, upon an object contacting the fingerprint sensor 102, the sensor 102 will capture an image of the object in order to have the processing unit 103 determine whether the object is a fingerprint of an authorised user or not by comparing the captured fingerprint to one or more authorised fingerprint templates pre-stored in the memory 105.

The fingerprint sensor 102 may be implemented using any kind of current or future fingerprint sensing principle, including for example capacitive, optical, ultrasonic or thermal sensing technology. Currently, capacitive sensing is most commonly used, in particular in applications where size and power consumption are important. Capacitive fingerprint sensors provide an indicative measure of the capacitance between (see FIG. 2) several sensing elements 202 and a finger 201 placed on the surface of the fingerprint sensor 102. Acquisition of a fingerprint image is typically performed using a fingerprint sensor 102 comprising a plurality of sensing elements 202 arranged in a two-dimensional manner.

In a general authorization process, the user places her finger 201 on the sensor 102 for the sensor to capture an image of the fingerprint of the user. The processing unit 103 evaluates the captured fingerprint and compares it to one or more authenticated fingerprint templates stored in the memory 105. If the recorded fingerprint matches the pre-stored template, the user is authenticated and the processing unit 103 will typically instruct the smart phone 100 to perform an appropriate action, such as transitioning from locked mode to unlocked mode, in which the user is allowed access to the smart phone 100.

With reference again to FIG. 3, the steps of the method performed by the fingerprint sensing system 101 (apart from capturing the image, which is carried out by the sensor 102) are in practice performed by the processing unit 103 embodied in the form of one or more microprocessors arranged to execute a computer program 107 downloaded to the storage medium 105 associated with the microprocessor, such as a Random Access Memory (RAM), a Flash memory or a hard disk drive. The processing unit 103 is arranged to cause the fingerprint sensing system 101 to carry out the method according to embodiments when the appropriate computer program 107 comprising computer-executable instructions is downloaded to the storage medium 105 and executed by the processing unit 103. The storage medium 105 may also be a computer program product comprising the computer program 107. Alternatively, the computer program 107 may be transferred to the storage medium 105 by means of a suitable computer program product, such as a Digital Versatile Disc (DVD) or a memory stick. As a further alternative, the computer program 107 may be downloaded to the storage medium 105 over a network. The processing unit 103 may alternatively be embodied in the form of a digital signal processor (DSP), an application specific integrated circuit (ASIC), a field-programmable gate array (FPGA), a complex programmable logic device (CPLD), etc. It should further be understood that all or some parts of the functionality provided by means of the processing unit 103 may be at least partly integrated with the fingerprint sensor 102.

It is noted that other biometric sensors 102 may be used, such as iris sensors, retina sensors, face recognition sensors, etc., for deriving biometric data of the user.

Figure 4B:
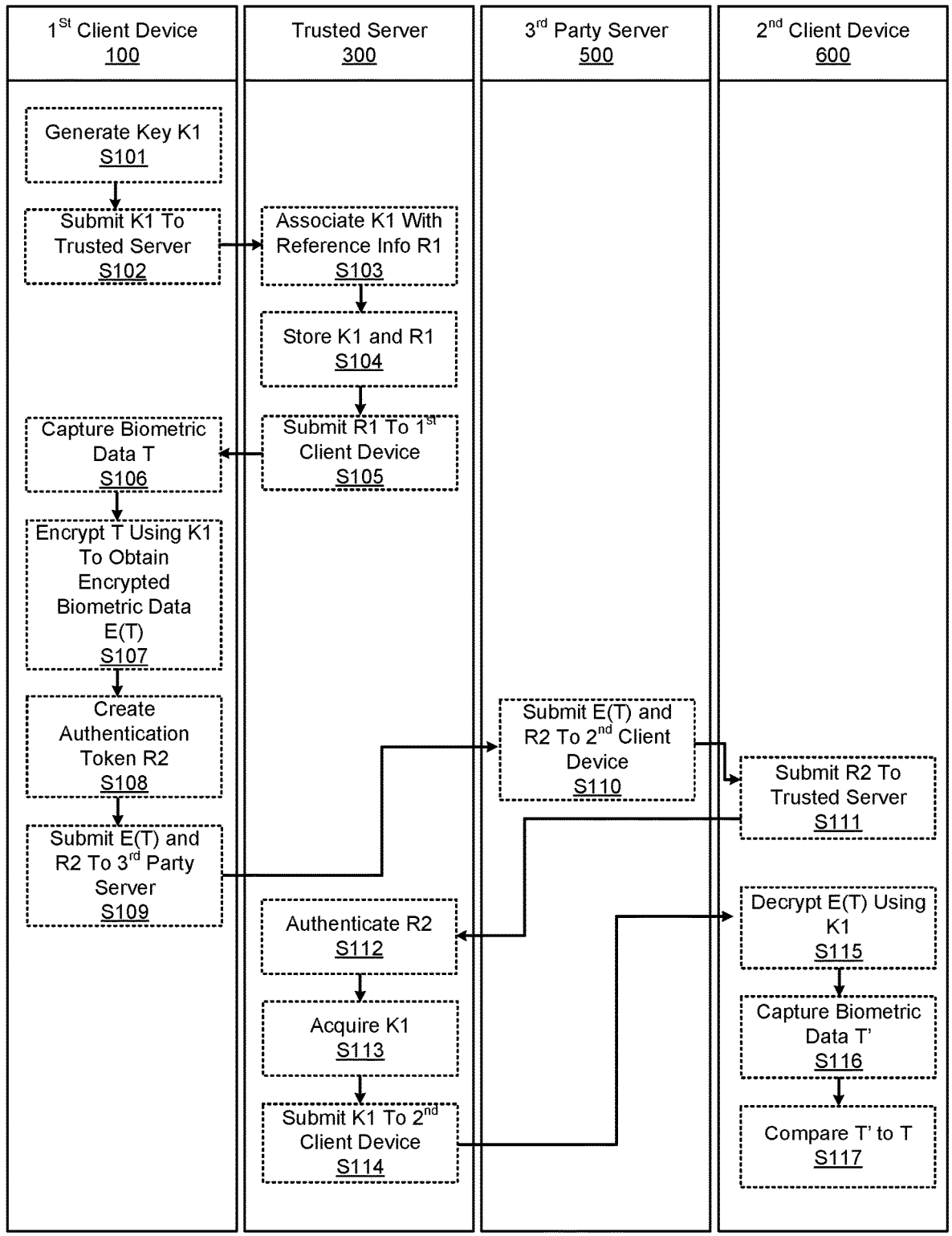

FIGS. 4A and 4B illustrate an embodiment of the invention of enabling authentication of a user 200 of a first client device 100 at a second client device 600 based on biometric data of the user 200 initially captured at the first client device 100.

In step S101, the first client device 100 generates at least one secret biometric data protection key K1 subsequently used for encrypting biometric data T of the user 200 which is captured by the first client device 100.

The secret key K1 is subsequently acquired by the second client device 600 for decrypting encrypted biometric data E(T) of the user 200. Hence, a number of secret keys may be generated in step S101 by the first device 100, in order to enable for a corresponding number of second client devices to decrypt encrypted biometric data E(T) of the user 200. However, in the following exemplifying embodiment, it is assumed that a single secret key K1 is generated.

In step S102, the first client device 100 submits the generated secret biometric data protection key K1 to a trusted server 300 node over a secure communication channel, for registering the secret key K1 with the trusted server 300.

Upon receiving the secret key K1, the trusted server 300 associates the received secret key K1 with reference information R1 (for subsequently identifying the key K1) in step S103 and stores the key K1 and the associated reference information R1 in a secure key repository located at, or remote from, the trusted server 300 in step S104.

In step S105, the trusted server 300 submits the reference information R1 to the first client device 100.

In step S106, the first client device 100 captures biometric data T of the user 200, for instance by utilizing a fingerprint sensing system 101 as described with reference to FIGS. 1-3.

Thereafter, in step S107, the first client device 100 encrypts the captured biometric data T using the generated secret key K1, resulting in the encrypted biometric data E(T).

Further, the client device 100 creates an authentication token R2 in step S108 based on the received reference information R1, which token R2 is configured to be authenticated by the trusted network node 300. For instance, the received reference information R1 may be encrypted with a symmetric key held by both the first client device 100 and the trusted server 300, or with a public key of the trusted server 300 in case a private-public key pair is used.

It is noted that step S106 of capturing the biometric data T of the user 200 can be performed before, or any time during, the registration of the secret key K1 with the trusted server 300. Further, step S107 of encrypting the biometric data T with the key K1 may be performed as soon as the biometric data T has been captured and the secret key K1 has been generated.

In step S109, the first client device 100 submits the encrypted biometric data E(T) and the authentication token R2 over a secure communication channel to a 3rd party server 500 for further distribution to the second client device boo.

Assuming for instance that the user 200 subscribes to a service provided by the $3^{rd}$ party server 500, such as an e-commerce service with which the user 200 authenticates herself using fingerprint data instead of a Personal Identification Number (PIN) to effect a payment of goods bought via the e-commerce service. The described embodiment advantageously enables authentication of the user 200 at a second client device 600 for accessing the e-commerce service provided by the $3^{rd}$ party server 500.

In another example, the $3^{rd}$ party server 500 belongs to a service provider such as a car rental company and the second client device 600 could be embodied in the form of a car key device with a fingerprint reader. When used for this application, the invention allows the car rental company to handle its customers completely online and having car keys available to customers also at unsafe places (out of office hours and at remote locations) without having a high risk of cars being stolen as car keys only can be activated by a user who actually has ordered and payed for a particular car. The user can trust the system as it ensures that the biometric data of the user—even if the biometric data is transferred to the car rental company—never will be available to the car rental company outside the car key device, which can be assumed to be secure (and its trustworthiness can be explicitly verified by the trusted server 300 in the system prior to transferring a decryption key to the car key device needed to decrypt a piece of encrypted biometric data of the user).

Hence, by submitting the encrypted biometric data E(T) and the authentication token R2 over a secure communication channel to the $3^{rd}$ party server 500 in step S109 for further distribution to the second client device 600, the first client device 100 effectively delegate its protected biometric data information to the $3^{rd}$ party server 500 that uses biometric identification to grant access to users subscribing to its offered services.

The trusted $3^{rd}$ party server 500 then submits the encrypted biometric data E(T) and the authentication token R2 to the second client device 600 in step S110.

The second client device 600 in its turn submits the authentication token R2 to the trusted server 300 over a secure communication channel in step S111.

The authentication token R2 indicates—by comprising the reference information R1—the secret key K1 previously registered by the first client device 100 with the trusted server 300, with which key K1 the biometric data T of the user 200 is encrypted.

The trusted server 300 authenticates the received authentication token R2 in step S112, using e.g. a symmetric key shared with the first client device 100 or a private key of the trusted server 300 corresponding to a public key used by the first client device 100, as previously has been discussed. As will be described in further detail subsequently, in case a private-public key pair is used, both the public key of the trusted server 300 and the private key of the first client device 100 are used to respectively encrypt and sign the authentication token R2

Further, the trusted server 300 may perform a set of security checks to verify the security state of the second client device 600. The invention is not limited to any particular means of verification, but may for instance include integrity verification of a secure execution environment running on the second client device 600 using for instance a Trusted Computing technology assuming the second client device 600 has Trusted Platform Module (TPM) support or verification of trust status of the second client device 600 based on credentials of the second client device 600 used for the secure channel establishment.

In case the token R2 is successfully authenticated, and the second client device 600 is considered to be a trusted device, the trusted server 300 decrypts the authentication token R2, and is thus given access to the reference information R1.

In step S113, the trusted server 300 thus uses the reference information R1 to acquire the secret key K1 from the key repository 400. It is noted that the key repository 400 may comprises a large number of keys which needs to be identified with a corresponding set of reference information.

In an embodiment, to advantageously ensure that the generated secret key K1 only is used once by a client device to which it is distributed, the trusted server 300 may further verify that the authentication token R2 has not been previously presented for the particular secret key K1 indicated by the reference information R1 of the authentication token R2. If this cannot be verified, the procedure may be aborted.

In step S114, the trusted server 300 submits the acquired secret key K1 to the second client device 600, wherein the second client device 600 subsequently is capable of decrypting the encrypted biometric data E(T) of the user 200 (as received from the $3^{rd}$ party server 500 in step S110) for enabling authentication of the user 200.

Subsequently, upon performing authentication of the user 200 with the $3^{rd}$ party server 500 via the second device 600, the encrypted biometric data E(T) received in step S110 is decrypted in step S115 with the secret key K1 received from the trusted server 300 in step S114, resulting in clear-text biometric data T.

These operations are performed in a secure execution environment of the second client device 600 in order to minimize the risk of any security breaches occurring.

Now, when the user 200 wishes to authenticate herself at the second client device 600, she presents her biometric data in the form of e.g. a fingerprint to the second client device 600 which captures the biometric data T' of the user 200 in step S116, and compares the captured biometric data with the decrypted biometric data T in step S117.

If there is a match, i.e. T'=T, the user 200 is authenticated and can thus access the service provided by the trusted $3^{rd}$ party server 500.

With reference to FIGS. 4A and 4B, the steps of the method performed by the trusted server 300 are in practice performed by a processing unit 301 embodied in the form of one or more microprocessors arranged to execute a computer program 302 downloaded to a storage medium 303 associated with the microprocessor, such as a Random Access Memory (RAM), a Flash memory or a hard disk drive. The processing unit 301 is arranged to cause the trusted server 300 to carry out the method according to embodiments when the appropriate computer program 302 comprising computer-executable instructions is downloaded to the storage medium 303 and executed by the processing unit 301. The storage medium 303 may also be a computer program product comprising the computer program 302. Alternatively, the computer program 302 may be transferred to the storage medium 303 by means of a suitable computer program product, such as a Digital Versatile Disc (DVD) or a memory stick. As a further alternative, the computer program 302 may be downloaded to the storage medium 303 over a network. The processing unit 301 may alternatively be embodied in the form of a digital signal processor (DSP), an application specific integrated circuit (ASIC), a field-programmable gate array (FPGA), a complex programmable logic device (CPLD), etc.

Figure 5:
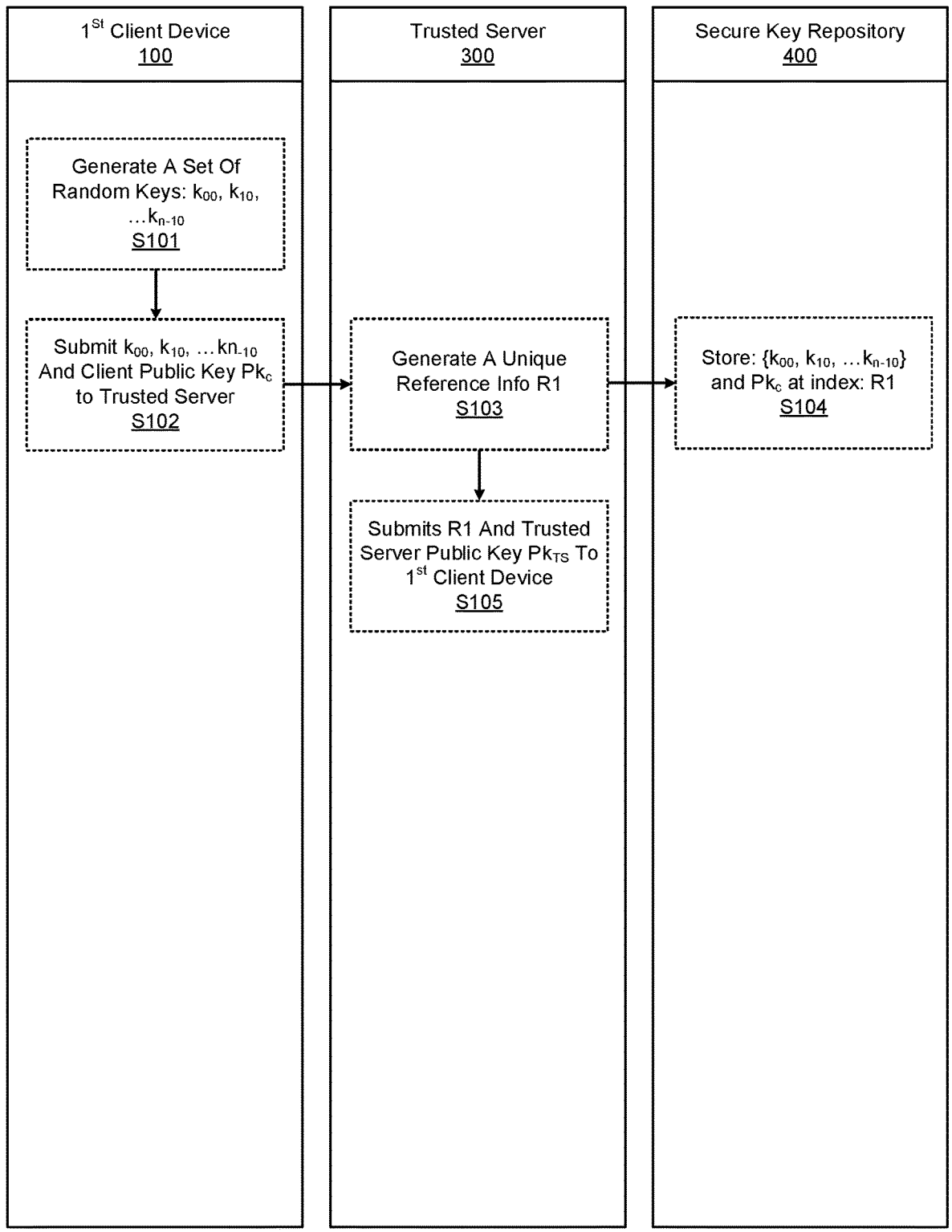
FIG. 5 illustrates an embodiment of the invention where secret keys used for encrypting the biometric data at the first client device is registered at a trusted server for distribution to a second client device.
Figure 6A:
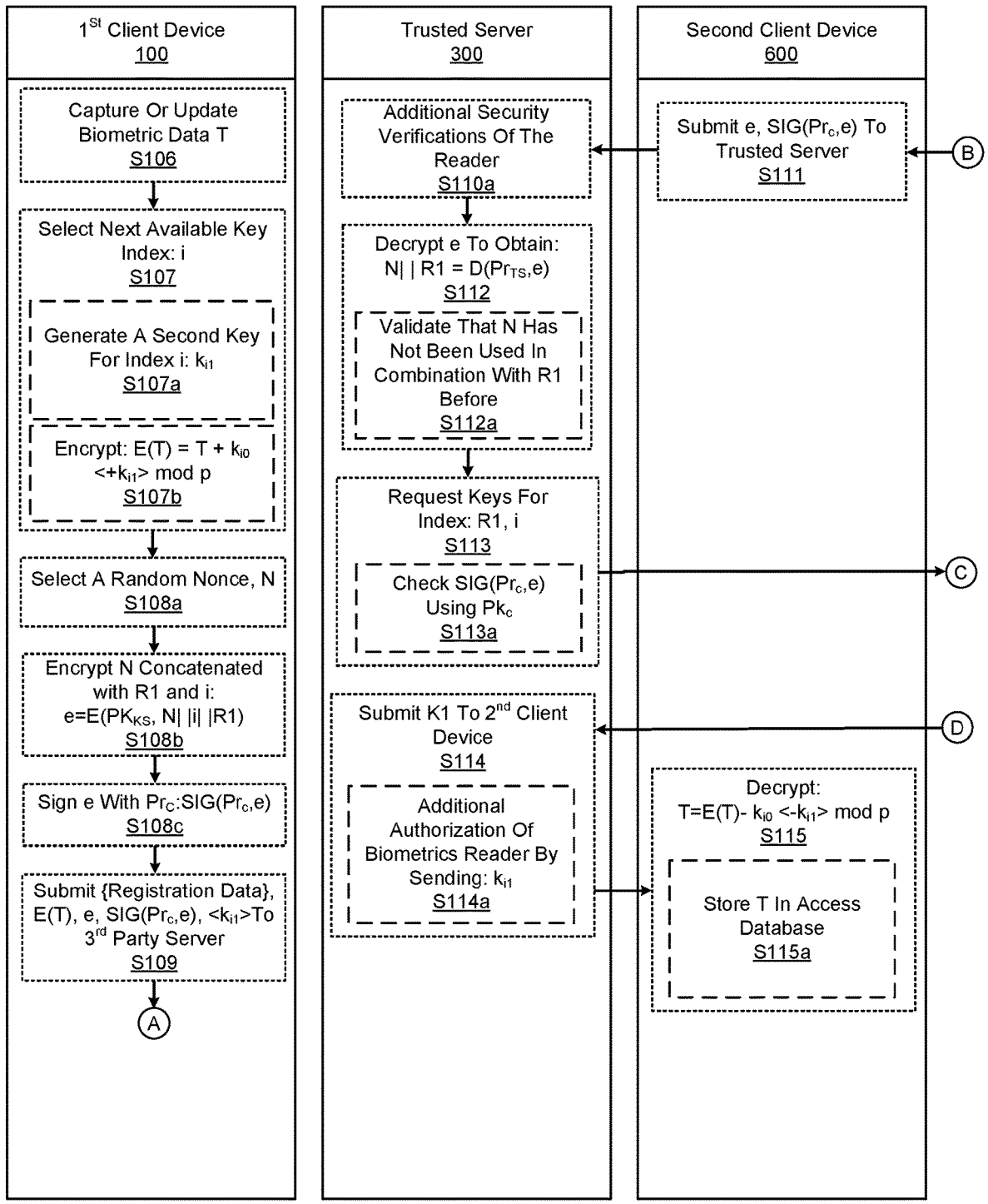
FIGS. 6A and 6B illustrate an embodiment of the invention of enabling authentication of the user at the second client device.
Figure 6B:
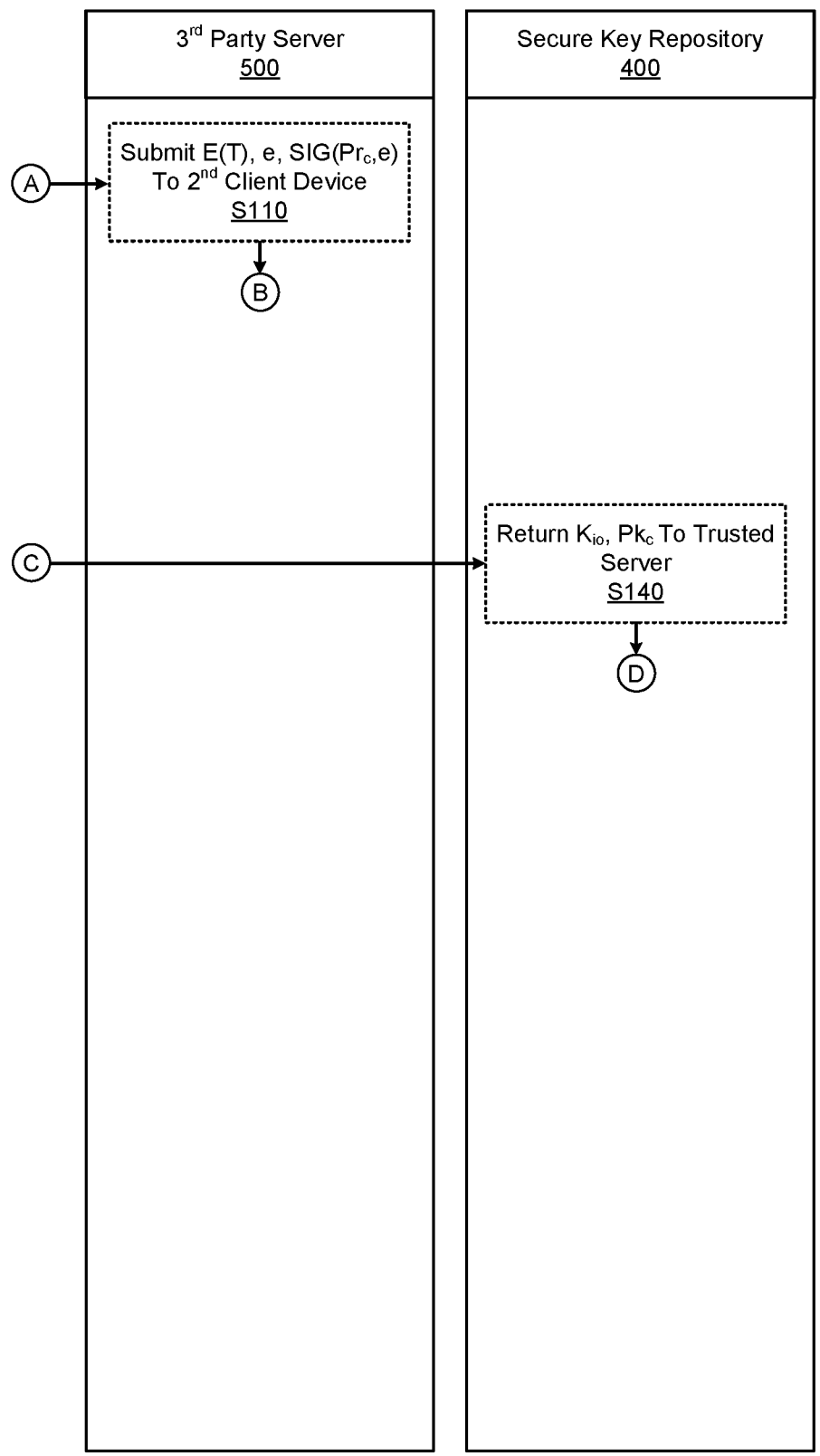

FIGS. 5, 6A, and 6B illustrate more detailed embodiments of enabling authentication of the user 200 of the first client device 100 at the second client device 600 based on the biometric data of the user.

FIG. 5 illustrates the initial registration of a batch of secret keys generated by the first client device 100 at the trusted server 300.

In step S101, the first client device 100 generates at least one secret key which subsequently will be used for encrypting biometric data of the user captured by the client device 100.

In this particular exemplifying embodiment, a batch of n one-time secret biometric data protection keys: $k_{00}$, $k_{10}$, . . . , $k_{n-10}$ is generated using e.g. a Random Number Generator (RNG). These keys are also stored by the first client device 100 in a suitable secure non-volatile memory together with any status information.

In case a private-public key pair is used, a public key $Pk_c$ of the first client device 100 is submitted along with the generated batch n of secret keys to the trusted server 300 in step S102 over a secure communication channel; i.e. a communication channel being protected in terms of confidentiality and integrity. The public key $Pk_c$ of the first client device 100 will be used subsequently by the trusted server 300 to verify a digital signature provided by the first client device 100 using its corresponding private key.

Upon receiving the batch of secret keys $\{k_{00}, k_{10}, \ldots, k_{n-10}\}$, the trusted server 300 associates the received batch of secret keys with reference information in the form of a unique number R1 in step S103 and stores in S104 the received batch of secret keys $\{k_{00}, k_{10}, \ldots, k_{n-10}\}$ along with the public key $Pk_c$ of the client device 100 and the reference information R1 in a secure key repository 400, possibly along with any appropriate user or client device data.

The trusted server 300 submits in step S105 the generated reference information R1 along with a public key $Pk_{TS}$ of the trusted server 300. The public key $Pk_{TS}$ of the trusted server 300 will be used by the first client device 100 to create an encrypted authentication token that the trusted server 300 subsequently is capable of decrypting.

The reference information and the public key is stored by the client device 100 in secure internal memory to be used subsequently once the client device 100 decides to share protected biometric data of the user 200 with a third party domain, as will be discussed in the following.

FIGS. 6A and 6B illustrate a more detailed embodiment of the first client device 100 providing encrypted biometric data E(T) to the second client device 600 via the $3^{rd}$ party server 400, and the subsequent authentication of the user 200 at the second client device 600 utilizing the encrypted biometric data E(T), which second client 600 acquires the secret key required to decrypt the encrypted biometric data E(T) from the trusted server 300. It is noted that a number of the steps described here may be performed in different order but still the same security level is achieved.

In step S106, the first client device 100 captures biometric data T of the user 200, for instance using fingerprint sensing as described with reference to FIGS. 1-3.

In step S107, the first client device 100 selects one of the (not previously used) secret biometric data protection keys $\{k_{00}, k_{10}, \ldots, k_{n-10}\}$ that was previously registered with the trusted server 300—for simplicity, it is assumed that the key with index i, i.e. $k_{i0}$, is selected—and encrypts the captured biometric data T using the selected secret key $k_{i0}$, resulting in E(T).

Optionally, in step S107a, to strengthen the biometric data encryption, a second one-time biometric data protection key for index i is generated: $k_{i1}$. Even though this second key is optional, the following described biometric data encryption will involve the second key $k_{i1}$.

In step S107b, the client device 100 uses the selected key $k_{i0}$ and the second key kit to encrypt the biometric data T of the user 200. The encrypted biometric data is denoted E(T).

Hence, either single-key encryption with key $k_{i0}$ of step S107 is employed, or the stronger dual-key encryption with keys $k_{i0}$ and kit of step S107b is utilized.

It is noted that the invention is not limited to any particular one-time encryption method but according to one embodiment the encryption is chosen as a simple modulo addition: $E(T)=T+k_{i0}+k_{i1}$ mod p, where p is an integer representing the size of the template T. According to an alternative embodiment E(T) is chosen as a one-time pad modulo two addition: $E(T)=T \oplus k_{i0} \oplus k_{i1}$.

As previously has been described with reference to FIGS. 4A and 4B, an authentication token R2 is created by the first client device 100.

In this particular embodiment, the authentication token R2 is created in step S108a by using an RNG to generate a random nonce N of suitable length.

Thereafter, in step S108b, the client device 100 uses the previously received public key $Pk_{TS}$ of the trusted server 300 to encrypt the generated random nonce N concatenated with the index i and the reference information R1 which the trusted server 300 previously associated with the generated batch of secret keys in step S104 of FIG. 5: $e=E(Pk_{TS}, N||i||R1)$. Hence, in order to create R2, a data set comprising a combination of the nonce N, the index i and the reference information R1 is encrypted with the public key of the trusted server 300.

In step S108c, the first client device 100 uses its private key $Pr_c$ to sign e in order to obtain a signed and encrypted token that refers to the selected secret one-time biometric data protection key $k_{i0}$: $SIG(Pr_c, e)$. According to an embodiment, additional data may be included in this signature, for instance a unique ID of the 3$^{rd}$ party server 500.

The authentication token R2 is thus composed of $SIG(Pr_c, e)$, e.

Advantageously, the first client device 100 submits the encrypted biometric data E(T), $SIG(Pr_c, R2)$ and R2 (and optionally the second secret key kit in case the dual-key encryption of step S107b is performed) to the 3$^{rd}$ party server 500 via a secure communication channel in step S109, thereby enabling authentication of the user 200 at another client device 600 for accessing services provided by the 3$^{rd}$ party server 500 as will be described in the following.

Hence, the 3$^{rd}$ party server 500 receives E(T), $SIG(Pr_c, e)$ and e (and optionally the second secret key kit) from the client device 100 in step S109.

The 3$^{rd}$ party server 500 decides which other client devices that potentially need to identify the user 200 by means of biometric data. To these client devices, the 3$^{rd}$ party server 500 sends the data received from the first client device 100 (except the second biometric data protection key $k_{i1}$ if in use): E(T), e, $SIG(Pr_c, e)$ in step S110, preferably over a secure channel.

These "other client devices" are for simplicity exemplified by the second client device 600. However, as was illustrated in step S101 of FIG. 5, a number of "other devices" corresponding to the number of generated secret keys $\{k_{00}, k_{10}, \ldots, k_{n-10}\}$ registered with the trusted server 300 can be envisaged.

The second client device 600 establishes a secure channel with the trusted server 300.

In an optional embodiment, as previously described, prior to processing any key request from the second client device 600, the trusted server 300 performs one or more security checks in step S110a to verify security status of the second client device 600 and a secure execution environment of the second client device 600 in which any sensitive data is processed. Hence, the trusted server 300 checks in step S110a whether the second client device 600 belongs to a set of trusted devices. The invention is not limited to any particular type of security checks, but they may for instance include integrity verification of the secure execution environment implemented on the biometric sensor of the client device 600 using for instance Trusted Computing technologies assuming the biometric sensor has Trusted Platform Module (TPM) support, or verification of the trust status of the biometric sensor based on credentials of the biometric sensor used for the secure channel establishment, and so forth.

Thereafter, in step S111, the second client device 600 submits the authentication token R2, i.e. e, $SIG(Pr_c, e)$, to the trusted server 300.

Upon receiving e and $SIG(Pr_c, e)$, the trusted server 300 uses its private key $Pr_{TS}$ to decrypt e in step S112, which is denoted $D(Pr_{TS}, e)=N||i||R1$, thereby authenticating the authentication token R2.

Now, if the decryption at step S112 succeeds, the second client device 600 is considered to be a trusted device, and the trusted server 300 may verify in step S112a in an optional embodiment that the random nonce N has not been used together with the reference information R1 before (by for instance maintaining an internal index cache memory with used nonce values). If it has been used before, the procedure is aborted with an error message to the second client device boo.

However, it is here assumed that the random nonce N has not been previously used, and the trusted server 300 turns to the key repository 400 in step S113 for acquiring the batch of secret one-time secret biometric data protection keys that corresponds to the reference information R1, and out of the batch of keys the particular key that corresponds to index i, which in this particular exemplifying embodiment is key $k_{i0}$, which is returned to the trusted server 300 in step S114 along with the public key $Pk_c$ of the first client device 100 that initially registered the batch of keys with the trusted server 300.

In step S113a, to further strengthen the process of authenticating the authentication token R2, the trusted server 300 uses the public key $Pk_c$ of the client first device 100 that initially registered the batch of keys with the trusted server 300 to further verify the received authentication token, by verifying the digital signature $SIG(Pr_c, e)$ received in step S111. Advantageously, by verifying the digital signature:

1) authentication is provided, i.e., the signed message was created by a known sender;
2) non-repudiation is provided, i.e., the sender cannot deny having sent the signed message; and
3) integrity is provided, i.e., the signed message was not altered in transit.

If the verification should fail, the authentication is typically aborted, and an error message is sent accordingly to the second client device 600.

In step S114, the trusted server 300 submits the secret one-time biometric data protection key $k_{i0}$ over the secure channel to the second client device 600.

As previously has been discussed, in case a secret second biometric data protection key kit optionally is used, that second key is sent to the second client device 600 over the secure channel in step S114a, which might happen at a much later occasion in time.

In step S115, the second client device 600 uses the received secret one-time biometric data template key $k_{i0}$ (and optionally the additional one-time biometric data protection key kit) to decrypt the received encrypted template E(T) to obtain the biometric data T in the clear.

If the modulus encryption option was used, the biometric data is then decrypted as: $T=E(T)-k_{i0}-k_{i1} \mod p$.

As was described with reference to FIG. 5, at this stage, an authentication procedure may take place.

However, in this particular exemplifying embodiment, the clear-text biometric data T of the user 200 is securely stored in step S115a at the second client device 600 in a protected volatile or non-volatile memory to subsequently be used to authenticate the user 200 whom should be granted access, via the second client device 600, to a service provided by the $3^{rd}$ party server 500.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed by a first client device of enabling authentication of a user of the first client device at a second client device based on biometric data captured by the first client device, comprising:
generating at least one secret key;
submitting the generated at least one secret key to a trusted network node over a secure communication channel for registering the at least one secret key with the trusted network node;
receiving reference information associated with the at least one secret key from the trusted network node;
capturing biometric data of the user;
encrypting the captured biometric data using the generated at least one secret key;
creating an authentication token based on the received reference information, wherein the authentication token is configured to be authenticated by the trusted network node; and
submitting the encrypted biometric data and the authentication token to a 3rd party network node.

2. The method of claim 1, wherein the step of generating at least one secret key comprises:
generating a set of secret keys and a public key of the first client device.

3. The method of claim 2, wherein the encryption of the captured biometric data comprises:
encrypting the captured biometric data using a previously not used key among the secret keys in the generated set.

4. The method of claim 1, wherein the submitting of the generated at least one secret key further comprises:
submitting a public key of the first client device, with which the trusted network node can authenticate the authentication token.

5. The method of claim 1, wherein the receiving of reference information further comprises:
receiving a public key of the trusted network node,
wherein creating the authentication token comprises encrypting the reference information with the public key.

6. The method of claim 4, wherein the creation of an authentication token comprises:
generating a random number; and
encrypting a data set including the generated random number, an index indicating the key used in the set of secret keys to encrypt the biometric data and the reference information, with the received public key of the trusted network node; wherein the submitting of the encrypted biometric data to a 3rd party network node further comprises:
submitting the encrypted data set to the 3rd party network node.

7. The method of claim 4, wherein the creation of an authentication token comprises:
digitally signing said encrypted data set with a private key of the first client device, wherein the submitting of the encrypted biometric data to a 3rd party network node further comprises:
submitting the digitally signed encrypted data set to the 3rd party network node.

8. A method performed by a second client device of enabling authentication of a user of a first client device at the second client device based on biometric data captured by the first client device, comprising:
receiving, from a 3rd party network node for authentication of the user of the second client device, encrypted biometric data of the user and an authentication token, wherein the first client device: (i) generates at least one secret key, (ii) submits the generated at least one secret key to a trusted network node over a secure communication channel for registering the at least one secret key with the trusted network node, (iii) receives reference information associated with the at least one secret key from the trusted network node, (iv) captures the biometric data of the user, (v) encrypts the captured biometric data using the generated at least one secret key, and (vi) creates the authentication token based on the reference information;
submitting the authentication token to the trusted network node over a secure communication channel, the authentication token indicating the secret key previously registered with the trusted network node by the first client device, wherein the biometric data captured by the first client device is encrypted by the first client device with the secret key; and
receiving the secret key from the trusted network node when the trusted network node authenticates the authentication token, wherein the encrypted biometric data can be decrypted using the received secret key.

9. The method of claim 8, further comprising:
decrypting the encrypted biometric data using the received secret key; and
storing the biometric data in a secure storage.

10. The method of claim 9, further comprising:
capturing biometric data of the user at the second device;
comparing the captured biometric data with the stored biometric data, wherein the user of the second client device is authenticated if the captured biometric data matches the stored biometric data.

11. The method of claim 9, further comprising:
receiving, from the 3rd party network node a further secret key with which the biometric data has been encrypted, wherein the decryption of the encrypted biometric data further comprises:

decrypting the encrypted biometric data using the received secret key and said received further secret key.

12. A method performed by a trusted network node of enabling authentication of a user of a second client device based on biometric data captured by a first client device, comprising:
   receiving at least one secret key from the first client device over a secure channel, wherein the at least one secret key is used by the first client device to encrypt the biometric data of the user captured by the first client device;
   associating the received at least one secret key with reference information;
   storing the reference information and the at least one secret key in a key repository;
   submitting the reference information to the first client device;
   receiving, from the second client device, an authentication token created by the first client device based on the received reference information, the authentication token indicating the at least one secret key previously registered with the trusted network node;
   authenticating the received authentication token;
   acquiring the at least one secret key indicated by the authentication token from the key repository; and
   submitting the acquired at least one secret key to the second client device, wherein the second client device utilizes the at least one secret key to decrypt the encrypted biometric data of the user to enable authentication of the user.

13. The method of claim 12, wherein the authentication of the received authentication token further comprises:
   verifying that the authentication token has not been previously presented to the trusted network node for the at least one key indicated by the reference information of the authentication token, wherein if the token previously has been presented the authentication procedure is aborted.

14. The method of claim 12, wherein the receiving of at least one secret key further comprises:
   receiving a public key of the first client device, with which the trusted network node can authenticate the authentication token; wherein the storing of the reference information and the at least one secret key in a key repository further comprises:
   storing the received public key of the first client device.

15. The method of claim 12, wherein the submitting of reference information further comprises:
   submitting a public key of the trusted network node, with which the reference information can be encrypted by the first client device for creating the authentication token.

16. The method of claim 14, wherein the received authentication token comprises:
   a data set including a random number generated by the first client device, an index indicating the secret key used by the first client device to encrypt the biometric data and the reference information, the data set being encrypted with the public key of the trusted network node by the first client device; and
   the encrypted data set being digitally signed with a private key of the first client device.

17. The method of claim 16, wherein the authenticating of the received authentication token comprises:
   decrypting the encrypted data set to obtain the index indicating the secret key used by the first client device to encrypt the biometric data and the reference information.

18. The method of claim 12, wherein the authentication of the received authentication token further comprises:
   verifying that the authentication token has not been previously presented to the trusted network node for the at least one key indicated by the reference information of the authentication token, wherein if the token previously has been presented the authentication procedure is aborted.

19. A trusted network node configured to enable authentication of a user of a second client device based on biometric data captured by a first client device, the trusted network node comprising one or more processors being configured to:
   receive at least one secret key from the first client device over a secure channel, wherein the at least one secret key is used by the first client device to encrypt the biometric data of the user captured by the first client device;
   associate the received at least one secret key with reference information;
   store the reference information and the at least one secret key in a key repository;
   submit the reference information to the first client device;
   receive, from the second client device, an authentication token created by the first client device based on the received reference information, the authentication token indicating the at least one secret key previously registered with the trusted network node;
   authenticate the received authentication token;
   acquire the at least one secret key indicated by the authentication token from the key repository; and
   submit the acquired at least one secret key to the second client device, wherein the second client device utilizes the at least one secret key to decrypt the encrypted biometric data of the user to enable authentication of the user.

20. A non-transitory computer-readable medium storing computer-executable instructions for causing the trusted network node to perform steps recited in claim 12 when the computer-executable instructions are executed on a processing unit included in the trusted network node.

* * * * *